Patented Aug. 21, 1951

2,564,914

UNITED STATES PATENT OFFICE 2,564,914

METHOD OF SEPARATING UNSATURATED HYDROCARBONS BY MEANS OF HYPOCHLOROUS ACID

Maurice J. Murray, Clarendon Hills, Ill., assignor to Universal Oil Products Company, Chicago, Ill., a corporation of Delaware No Drawing. Application June 28, 1946, Serial No. 680,061

4 Claims. (Cl. 260—677)

The present invention relates to the separation of the components of a hydrocarbon mixture containing olefins and in a more specific application thereof, it relates to the selective reaction of hypochlorous acid with certain classes of olefinic components contained in said hydrocarbon mixture. The selective separation process herein referred to involves the conversion of one or more of the olefinic components of a hydrocarbon mixture into chemically different derivatives thereof, the properties of which vary sufficiently from like properties of the remaining hydrocarbons that said remaining hydrocarbon components resisting the reaction with hypochlorous acid become readily recoverable from the reaction products.

It is one object of the present invention to provide a process for the separation of the components of an olefinic hydrocarbon mixture containing two or more of the following classes of olefinic hydrocarbons: cyclic, tertiary, secondary and normal olefins.

It is another object of my invention to provide a means for the removal of a particularly desired or valuable component from an olefinic hydrocarbon mixture, such as a thermally cracked gasoline fraction.

Still another object of my invention concerns a process for the separation of a mixture of olefins containing components of varying structure without causing the simultaneous isomerization of the component or components recovered thereby.

Broadly, the present invention comprises reacting one or more classes of olefinic components contained in a hydrocarbon mixture with hypochlorous acid, either selective as to one of the component classes of olefins or general as to all classes of olefinic components, separating the products of the reaction and recovering the remaining hydrocarbons.

In a more specific embodiment of my invention, a hydrocarbon mixture containing one or more of the general classes of olefinic hydrocarbons is contacted at a temperature within the range of from about 0° to about 30° C. with an aqueous hypochlorous acid reagent of sufficient concentration to effect reaction of the cyclic, tertiary and secondary olefins with said reagent and fractionating the products of the reaction to recover the normal olefins.

Other more specific embodiments of the present invention refer to the selective reaction of said hypochlorous acid reagent with the cyclic, tertiary, and/or secondary olefins of a hydrocarbon mixture containing the same and recovering from the products of said reaction the remaining olefins and/or other hydrocarbons resisting the selective action of said reagent.

According to the separation process comprising the present invention, the reaction of hypochlorous acid with various classes of olefinic hydrocarbons varies in the following decreasing order of selectivity or preference: cyclo-olefins, tertiary olefins, secondary olefins and normal olefins. By cyclo-olefins as referred to herein I mean those hydrocarbons containing an unsaturated cyclic structure of non-aromatic character containing three or more carbon atoms at least two of which are joined by an olefinic double bond. The unsaturated ring comprising the nucleus of said cyclic olefin may contain any number of carbon atoms, generally not exceeding 8 and any number of unsaturated olefinic double bonds, generally not in excess of about 2. Further, the ring may be substituted by hydrogen atoms, alkyl groups such as methyl, ethyl, propyl, isopropyl, etc., alkenyl groups such as the vinyl radical, propenyl or isopropenyl groups, etc. and/or alkadienyl radicals such as butadienyl, pentadienyl, etc. groups. Typical of such compounds are cyclohexene, methylcyclohexene, vinylcyclohexene, and butadienylcyclohexene. Within the group of hydrocarbons herein referred to as tertiary olefins I mean to include those hydrocarbons containing any one of the following structural groups:

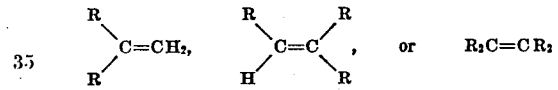

where R represents an alkyl radical such as methyl, ethyl, propyl, etc. Typical of the tertiary olefins are such hydrocarbons as isobutylene ($H_2C=C(CH_3)_2$), 2-methylbutene-2

$((CH_3)_2=CHCH_3)$ etc. Secondary olefins as classed herein refer to the 1,2-dialkyl ethylenes, containing the following arrangement of carbon atoms:

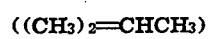

where R is again represented as an alkyl group such as methyl, ethyl, propyl, etc. Of the secondary olefins, typical representatives are butene-2 ($H_3C-HC=CH-CH_3$), pentene-2 or methylethylethylene ($CH_3-CH_2-HC=CH-CH_3$) etc. Normal olefins are defined as the alkene-1 hydrocarbons in which the olefinic unsaturation occupies a terminal carbon atom or contain the group:

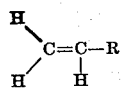

where, again, R is an alkyl group. Propylene ($CH_3HC=CH_2$), butene-1 ($CH_3CH_2HC=CH_2$), pentene-1 ($CH_3CH_2CH_2HC=CH_2$), etc. represent typical alkene-1 hydrocarbons within this classification. Thus, a mixture of olefins containing various components from the above classification, as for example, a mixture containing cyclo- and normal olefins which cannot be resolved into fractions containing only one class of olefins by the usual physical means such as by ordinary fractional or azeotropic distillation because of the close proximity of the physical properties of said components, readily becomes separable by changing the chemical composition and structure of one or more of said components thereby changing its physical properties and permitting resolution of the mixture on the basis of the change in physical properties of one or more of the components of said mixture.

In the above cited mixture containing cyclic and normal olefins, for example, when utilizing the hypochlorous acid reagent according to the process of this invention, the cyclic olefinic components react preferentially with the reagent to form compounds differing in boiling points from the normal olefins, thus providing a means for separating said components from each other.

I have found that when the original mixture of olefins contains representatives of all of the above olefinic hydrocarbon classes, that is, cyclic, tertiary, secondary and normal olefins, the mixture may be treated with hypochlorous acid under a given set of conditions to cause the reaction only of the more reactive cyclic olefins contained in the mixture. The resultant product, after being subjected to fractionation or other intermediate separation process to remove the reaction products of said cyclic olefins and hypochlorous acid may be contacted with additional reagent under sufficiently more reactive conditions to cause the conversion of only those olefins next in the respective order of reactivity (that is, the tertiary olefins) etc. until only the residue comprising the olefins most resistant to the action of the reagent remain (that is, the normal olefins). It is also within the scope of my invention to treat the mixture of hydrocarbons containing olefins under conditions so as to effect the reaction of the reagent with all but the normal olefins, separating the products of the reaction and recovering said normal olefins as that portion of the original mixture which preferentially resists reaction with the hypochlorous acid reagent.

The process is also applicable to hydrocarbon mixtures containing various types of hydrocarbons other than olefins, such as paraffinic and aromatic hydrocarbons which ordinarily remain substantially unaffected by the reagent under such conditions as affect only the olefinic components of said mixture. The present process may thus be applied as a method for the general removal of all olefins from the mixture or the selective removal of only certain classes of olefins by providing the proper conditions of reaction to effect the purpose intended. The desired hydrocarbons may subsequently be recovered from the reaction mixture free of the olefins desired to be removed.

In general, the selective action of hypochlorous acid is obtained by varying the total quantity of hypochlorous acid in contact with the olefinic hydrocarbon mixture. The period of contact between the olefinic hydrocarbon mixture and reagent is believed to have no substantial effect on total removal of all olefins from the mixture, nor is the temperature of reaction a vital factor. The reaction is, on the other hand, believed to be progressive, dependent on the quantity of reagent added to the hydrocarbon mixture; if sufficient hypochlorous acid is present to react with only the cyclic olefins, the tertiary components are substantially unaffected. If additional reagent is added, sufficient to react with not only the cyclic olefins, but the tertiary as well, it has been observed that both classes will be attacked and can be thereafter removed as the reaction product of the hypochlorous acid.

A significant advantage of the present hypochlorous acid reagent over many of the separating agents utilized by the prior art in processes for separation of olefins is the fact that the reagent causes no recognizable degree of isomerization of the hydrocarbons remaining in the mixture. An olefinic hydrocarbon fraction, for example, containing predominantly normal olefins may be purified of its content of secondary olefins (usually associated with the normal olefins in such a mixture) without any substantial isomerization of the normal olefins by the use of the present reagent. The process may therefore be readily employed when it is desired to obtain substantially pure normal olefins by a process of separation involving the removal of other classes of olefins from the mixture.

The hypochlorous acid reagent utilized herein to effect separation of olefins from hydrocarbon mixtures according to the present invention is usually employed as the aqueous solution, prepared by the action of a stronger acid on a hypochlorite salt, although under some conditions the reagent may be formed by the addition of elemental chlorine to water, preferably under pressure and in the presence of the hydrocarbon mixture. Sodium or calcium hypochlorite, or any other hypochlorous acid salt, or reagent capable of liberating hypochlorous acid in an aqueous solution of the same, (represented for example by the common household bleach), may be utilized herein. The free hypochlorous acid is released from its alkali or alkaline earth metal salts by the addition of a stronger mineral acid, such as hydrochloric or sulfuric acid, to the aqueous solution of salt, or by the addition of carbon dioxide to the hypochlorite solution, for example, by adding Dry Ice or a carbonic acid salt such as sodium-bicarbonate together with a mineral acid preferably diluted prior to the reaction. The hypochlorous acid reagent may be dilute or concentrated, depending upon whether selective or complete removal of olefins from the olefinic charge is desired. The aqueous solution of hypochlorite salt from which the present reagent is generated may contain up to about 10 to 20% or higher chlorine as the hypochlorite salt but generally speaking, more dilute solutions are preferred. The process is usually conducted at atmospheric pressure, however, superatmospheric pressure may be employed to advantage, especially when the hypochlorous acid is formed in situ by contacting chlorine with a mixture of water and olefins to be separated. Superatmospheric pressures as well as low temperatures are generally required when charging a mixture of normally gaseous hydrocarbons in order to maintain the charge in liquid phase. When the charge consists of a normally liquid mixture of olefins or olefin-containing hydrocarbon mixture, such as certain olefinic gasoline stocks, atmospheric pressure is generally sufficient and provides for more economical operation. The temperatures at which the process is operated are preferably maintained as low as it is feasible to operate, for example, about 0° C., and generally not in excess of from about 20° to about 30° C., although higher temperature may be employed for specific operations, such as in the case where it is desired to remove all olefins from a mixture of hydrocarbons containing said olefins.

In the course of the reaction between olefins and hypochlorous acid, various alkyl halides and alkyl chlorohydrins are formed, which, as previously pointed out, are separated from the remaining hydrocarbons of the original mixture by virtue of the differences in physical properties of said products and particularly the boiling points thereof as compared to the original hydrocarbon mixture. Such products may be separately recovered as by products of the original reaction or further subjected to additional reactions to recover conversion products thereof.

The process hereinabove described comprising the present invention is preeminently applicable to the total removal of the olefins from hydrocarbon mixtures containing normal olefins and/or paraffins, but it is to be understood that the invention is by no means limited to such an operation and may be employed for the separation of olefins from any hydrocarbon mixture as hereinabove set forth. The following example is introduced for the purpose of further illustrating the invention and the novel results obtainable thereby, but said example is not intended to limit in any manner the present invention either as to charging stock, to the method of contacting the hypochlorous acid reagent with the hydrocarbon charge, to means of separating the products or to other factors and conditions within the scope of the present invention, 50 cc. of thermally cracked gasoline (boiling range 70-97° C.) was stirred with 150 cc. of commercial Clorox as Dry Ice was gradually added. The carbon dioxide liberated by evaporation of the Dry Ice reacted with the sodium hypochlorite salt present in the Clorox to produce hypochlorous acid which selectively reacted with the tertiary, cyclic, and secondary olefins contained in the thermally cracked gasoline to form alkyl halides and alkyl chlorohydrins. The low boiling unreacted hydrocarbons were removed from the product by distillation. Examination of the product by infra red absorption analysis showed that the only olefins remaining were of the alkene-1 type.

I claim as my invention:

1. A process for separating the components of an olefinic hydrocarbon mixture containing a straight chain 1-olefin and at least one other more reactive olefin selected from the group consisting of cyclic olefins, tertiary olefins and 1,2-dialkyl ethylenes, which comprises contacting said mixture in liquid phase with a quantity of aqueous hydrochlorous acid sufficient to react with said more reactive olefin but insufficient to react with said 1-olefin, and separating the resultant chlorine-containing products from unreacted 1-olefin.

2. The process of claim 1 further characterized in that said hydrocarbon mixture is contacted with said acid at a temperature of from about 0° C. to about 30° C.

3. The process of claim 1 further characterized in that said hydrocarbon mixture comprises thermally cracked gasoline.

4. The process of claim 3 further characterized in that the thermally cracked gasoline is contacted with the aqueous hypochlorous acid at a temperature of from about 0° C. to about 30° C.

MAURICE J. MURRAY.

REFERENCES CITED

The following references are of record in the file of this patent:

UNITED STATES PATENTS

| Number | Name | Date |
|---|---|---|
| 972,952 | Walker | Oct. 18, 1910 |
| 1,492,969 | Dunstan | May 6, 1924 |
| 1,962,181 | Egloff | June 12, 1934 |
| 1,997,861 | Egloff et al. | Apr. 16, 1935 |
| 2,007,168 | Kautter | July 9, 1935 |
| 2,156,070 | Stern et al. | Apr. 25, 1939 |